Dec. 30, 1941.　　　　P. REED　　　　2,267,949

HAIR WAVING SHEARS

Filed Oct. 31, 1940

INVENTOR
Paul Reed

Patented Dec. 30, 1941

2,267,949

UNITED STATES PATENT OFFICE 2,267,949

HAIR WAVING SHEARS

Paul Reed, Beaver Falls, Pa., assignor of one-third to H. M. Hartnett and one-third to Milton Weiner, both of Beaver Falls, Pa.

Application October 31, 1940, Serial No. 363,637

2 Claims. (Cl. 30—195)

The present invention relates to the art of waving hair, and more particularly to shears to be used for imparting a wave to the human hair.

Heretofore it has been found that appropriate waves can be imparted to hair by the cutting thereof in various different ways. For example, it has heretofore been found possible to impart a satisfactory wave to hair by appropriate manipulation of thinning shears provided with one ordinary blade and a blade having a plurality of spaced cutting teeth and cavities arranged alternately along the length thereof. In these shears the ordinary blade is somewhat narrower than the other and the depressions or cavities between the teeth on the other blade are sufficiently deep that some of the hair will be forced thereinto and not cut, whereas the hair caught between the blade and the upper ends of the teeth will be severed. However, in order to impart a wave to hair by such shears the operator must know how to manipulate the shears or nothing more than an ordinary thinning operation will result.

In accordance with the present invention, I provide shears which may be used for imparting a wave to hair without the application of any extraordinary skill in the use thereof. The shears which I provide are of such character that it is impossible to use them with any degree of intelligence without imparting to the hair a substantial and entirely satisfactory wave. This highly desirable object can be accomplished with the shears which I provide, despite the fact that they are quite simple in structure and relatively inexpensive to manufacture. The cost of manufacturing shears which will accomplish my object is only slightly in excess of the cost of manufacturing ordinary shears having straight cutting edges.

In the accompanying drawing I have shown for purposes of illustration only a preferred embodiment of my invention.

Figure 1:
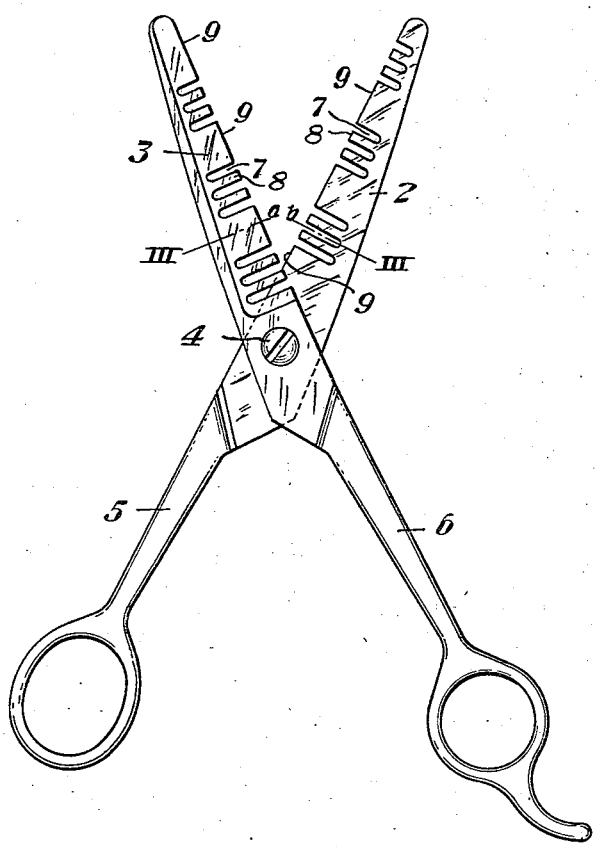
Figure 1 is a plan view of a pair of shears embodying my invention.
Figure 2:
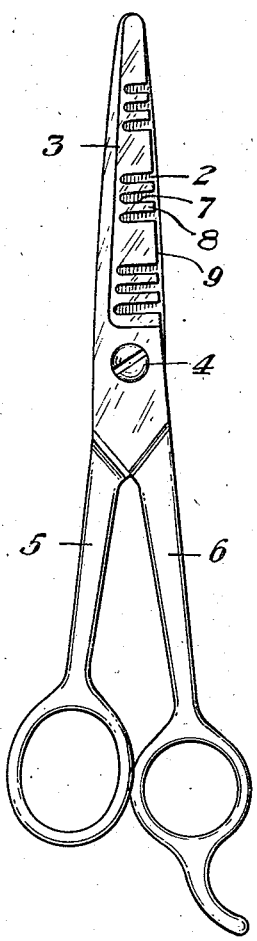
Figure 2 is a view similar to Figure 1 except that the shears are shown in completely closed position.
Figure 3:
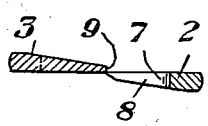
Figure 3 is a section taken along the lines III—a and III—b of Figure 1.

As shown in the drawing, the shears which are provided by my invention embody the blades 2 and 3 which are pivotally fastened together by means of a screw 4. The blades 2 and 3 are provided with handles 5 and 6 which extend beyond the pivot screw 4 and which are used in moving the blades toward and away from each other in the usual manner. Each blade is provided with a plurality of alternately arranged cavities 7 and projections or cutting teeth 8 spaced along the cutting edge thereof. The alternate cavities and cutting teeth do not extend throughout the length of each blade but are arranged in groups which are spaced apart by relatively long intermediate cutting edges 9. As shown in the drawing, each group of alternate cavities and teeth contains three cavities and two cutting teeth. However, it will be understood that my invention is not specifically limited to this number of alternate teeth and cavities in each spaced group and that any suitable number of alternate teeth and cavities may be provided in each group. As shown in the drawing, the length of each intermediate cutting edge 9 is approximately the same as the distance from one end of each intermediate cutting edge 9 to the adjacent edge of the next intermediate cutting edge; that is, the length of each intermediate cutting edge is approximately the same length as the cavities and teeth in each group. However, it will be understood that this is not an essential feature of my invention, as the intermediate cutting edges can be made longer or somewhat shorter than shown in the drawing.

The teeth and cavities on one blade do not cooperate with the adjacent cavities and teeth on the other blade. The intermediate cutting edges 9 on one blade are disposed opposite and cooperate with the cavities and cutting teeth on the other blade. Consequently, the hair coming in contact with an intermediate cutting edge on the one blade will be cut by the cooperation of said intermediate cutting edge with the spaced teeth and cavities on the other blade.

In the operation of shears of this character a plurality of strands of hair are placed between the blades and the blades moved toward each other. As the blades close some strands of hair will be severed by the teeth on one blade and the intermediate cutting edge on the other blade. Some of the strands of hair will not be cut in this manner but will be forced downwardly in the cavities on the one blade and some of the hair will be forced into the cavities on the other blade. These hairs are moved sidewise into these cavities, some being moved in one direction and others being moved in the other direction. These hairs will not be cut until the shears are closed further. They will not be severed until the shear blades are closed to a sufficient extent to cause the intermediate cutting edges 9 to cooperate with the lower ends of the cavities. As stated above, some of the hairs are forced in one direction and others are forced in the other direction, and as a consequence the hair will be cut to various different lengths. This results in the imparting of a definite wave to the hair.

While it is difficult to explain why the cutting of the hair in this manner will impart a definite wave to it without the operator possessing any particular degree of skill, I attribute it to the fact that some of the hairs are cut in a definite plane by cooperation between the upper edges of the teeth on the one blade and the intermediate cutting edges on the other blade and some of the hairs are forced in one direction into the cavities of the one blade and still others are forced in the opposite direction into the cavities on the other blade. The alternate arrangement of intermediate cutting edges of substantial length and groups of cavities and cutting teeth also plays an important part in the formation of the wave.

While I have shown and described a preferred embodiment of my invention, it will be understood that I do not intend that my invention shall be limited to the specific size and arrangement of cavities, cutting teeth and intermediate cutting edges described herein. It will be obvious that the advantages of my invention may be obtained where various departures are made from the foregoing description and from the type of shears shown in the drawing.

I claim:

1. A pair of shears for imparting a wavy appearance to hair comprising pivotally mounted cutting blades having handles for moving the blades toward and away from each other, each blade having a plurality of alternately arranged cutting cavities and cutting teeth arranged in groups and a plurality of straight and continuous cutting edges alternating said groups, the cutting edges of one blade cooperating with the cavities and cutting teeth of the other.

2. A pair of shears for imparting a wavy appearance to hair comprising pivotally mounted cutting blades having handles for moving the blades toward and away from each other, each blade having a plurality of groups of alternately arranged cutting cavities and cutting teeth, the groups being spaced from each other by straight continuous cutting edges, each cutting edge being disposed opposite a group of alternately arranged cavities and cutting teeth on the opposite blade.

PAUL REED.